US009587783B2

(12) United States Patent
Kofler et al.

(10) Patent No.: US 9,587,783 B2
(45) Date of Patent: Mar. 7, 2017

(54) HOLDING APPARATUS FOR A MULTIMEDIA DEVICE

(71) Applicants: BIKECITYGUIDE APPS GMBH, Graz (AT); Daniel Kofler, Graz (AT)

(72) Inventors: Daniel Kofler, Graz (AT); Andreas Stueckl, Berlin (DE); Dietmar Hofer, Graz (AT)

(73) Assignees: BIKECITYGUIDE APPS GMBH, Graz (AT); Daniel Kofler, Graz (AT)

(*) Notice: Subject to any disclaimer, the term of this patent is extended or adjusted under 35 U.S.C. 154(b) by 0 days.

(21) Appl. No.: 14/777,757

(22) PCT Filed: Mar. 17, 2014

(86) PCT No.: PCT/AT2014/000049
§ 371 (c)(1),
(2) Date: Sep. 17, 2015

(87) PCT Pub. No.: WO2014/146151
PCT Pub. Date: Sep. 25, 2014

(65) Prior Publication Data
US 2016/0281919 A1    Sep. 29, 2016

(30) Foreign Application Priority Data
Mar. 18, 2013  (DE) .................. 10 2013 005 175

(51) Int. Cl.
*B62J 11/00*   (2006.01)
*F16M 13/02*   (2006.01)
(Continued)

(52) U.S. Cl.
CPC ............ *F16M 13/022* (2013.01); *B62J 11/00* (2013.01); *F16B 2/22* (2013.01); *F16B 2/08* (2013.01)

(58) Field of Classification Search
CPC .... F16M 13/022; F16M 11/041; F16M 13/00; F16B 2/22; B62J 11/00; B65D 63/00; Y10T 29/49826
(Continued)

(56) References Cited

U.S. PATENT DOCUMENTS 2,373,328 A * 4/1945 Morehouse .............. H02G 7/10
174/135
3,210,033 A * 10/1965 Deardorf ................. F16L 3/233
248/74.3
(Continued)

FOREIGN PATENT DOCUMENTS

DE         10206310      8/2002
DE       20201105891    11/2011
(Continued)

OTHER PUBLICATIONS

International Search Report for PCT/AT2014/000049 English translation attached to original, Both completed by the European Patent Office on Jun. 30, 2014, All together 6 Pages.
(Continued)

*Primary Examiner* — Nkeisha Smith
(74) *Attorney, Agent, or Firm* — Brooks Kushman P.C.

(57) ABSTRACT

Holding apparatus for connecting a multimedia device in an articulated and detachable manner to a rod-like object, having two belt sections together with loop sections, connected by a middle section which forms a support. The first belt section can be passed through a passage opening which is arranged in the second belt section or in the middle section, wherein the belt-like holding apparatus surrounds a space which adjoins the lower face of the middle section substantially in the form of a twisted cycloid, and the two loop sections can be moved under prestress to an assembly position which faces the support. At least one of the loop sections has in each case at least three elastically stretchable
(Continued)

holding strands which laterally delimit at least two holding openings which are arranged next to one another in a direction which runs transverse to the longitudinal extent of the belt-like holding apparatus.

13 Claims, 4 Drawing Sheets

(51) Int. Cl.
  *F16B 2/22* (2006.01)
  *F16B 2/08* (2006.01)
(58) Field of Classification Search
  USPC .................. 248/693; 24/16 PB, 335, 339, 41
  See application file for complete search history.

(56) References Cited

U.S. PATENT DOCUMENTS

| | | | | |
|---|---|---|---|---|
| 3,981,048 | A * | 9/1976 | Moody | F16L 3/233 24/16 PB |
| 4,112,988 | A * | 9/1978 | Nelson | B25B 23/101 24/16 PB |
| 4,377,872 | A * | 3/1983 | Daniell, Jr. | A41F 9/002 2/321 |
| 4,910,835 | A * | 3/1990 | Carpenter | F16G 11/00 24/129 R |
| 5,421,494 | A * | 6/1995 | Kolton | A47G 25/743 206/301 |
| 5,522,122 | A * | 6/1996 | Turchick | B62J 6/00 224/420 |
| 5,692,268 | A * | 12/1997 | Case | B62J 6/00 224/420 |
| 6,073,315 | A * | 6/2000 | Rasmussen | B65D 63/1018 24/16 PB |
| 7,437,804 | B1 * | 10/2008 | Geiger | B65D 63/1072 24/16 PB |
| 8,763,213 | B2 * | 7/2014 | Burdett | B60P 7/0823 24/300 |
| 8,827,234 | B2 * | 9/2014 | Baker | F16M 13/00 224/218 |
| 9,182,069 | B2 * | 11/2015 | Haarburger | F16M 13/022 |
| 2010/0199462 | A1 * | 8/2010 | Voigt | B21D 19/00 24/16 PB |
| 2012/0235380 | A1 * | 9/2012 | Taiga | B62J 11/00 280/288.4 |
| 2013/0248571 | A1 * | 9/2013 | Jones | B62H 5/00 224/463 |
| 2014/0096344 | A1 * | 4/2014 | Creato | B65D 85/04 24/16 PB |
| 2015/0033509 | A1 * | 2/2015 | Dietrich | B65D 63/1018 24/16 PB |
| 2015/0208745 | A1 * | 7/2015 | Duhatschek | A41D 19/01511 2/463 |
| 2015/0267862 | A1 * | 9/2015 | Mishler | F16M 13/022 248/214 |

FOREIGN PATENT DOCUMENTS

JP    S57134877    8/1982
JP    3176972    7/2012

OTHER PUBLICATIONS

Website http://www.gohappy.com.tw/tpl/images/fu/Image/200808/2%28200%29.jpg Dated Dec. 2, 2012, Retrieved from Espacenet on Dec. 3, 2015, XP 055125753, 2 Pages, "S-Sun Easy Install".

* cited by examiner

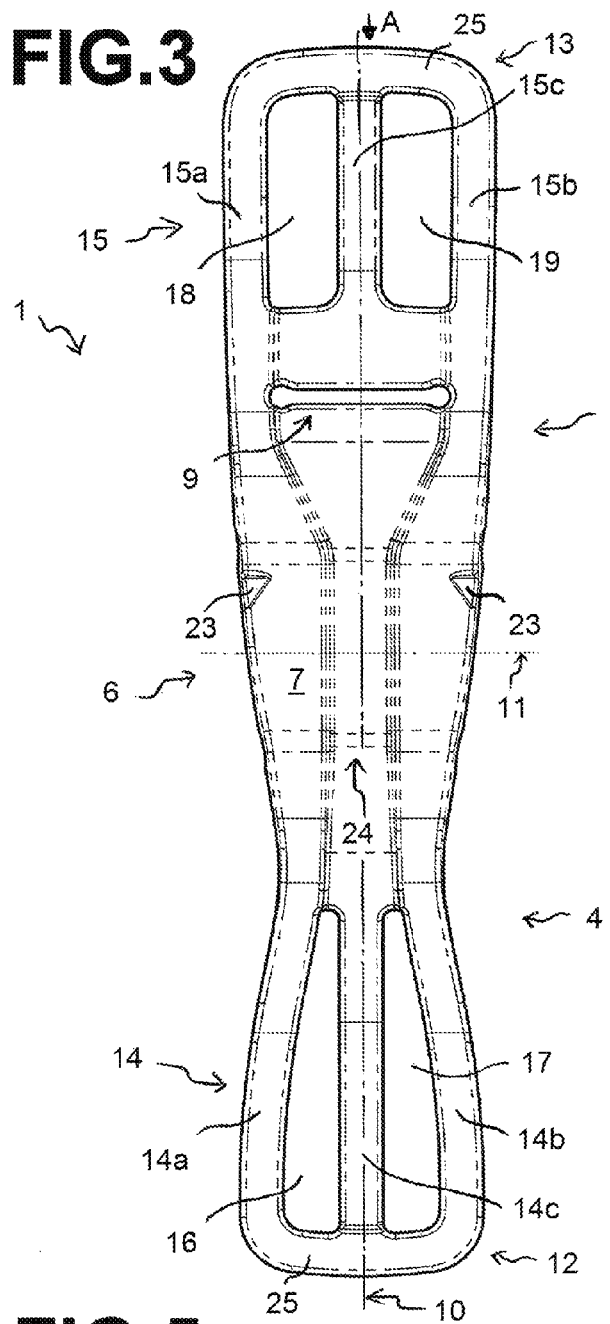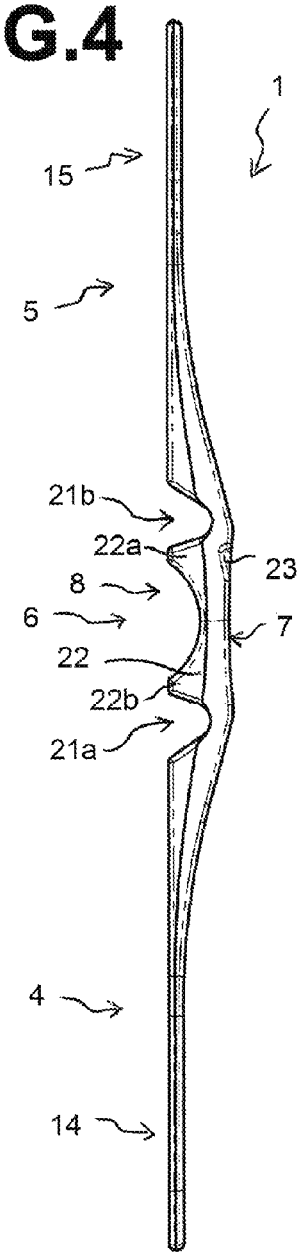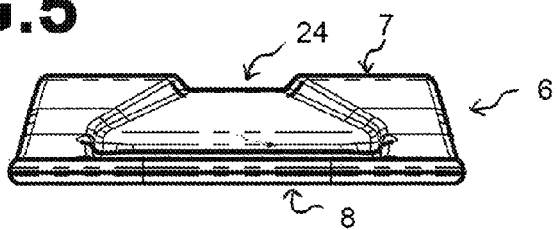

HOLDING APPARATUS FOR A MULTIMEDIA DEVICE

CROSS-REFERENCE TO RELATED APPLICATIONS

This application is the U.S. national phase of PCT Application No. PCT/AT2014/000049 filed on Mar. 17, 2014, which claims priority to DE Patent Application No. 10 2013 005 175.4 filed on Mar. 18, 2013, the disclosures of which are incorporated in their entirety by reference herein.

TECHNICAL FIELD

The invention relates to a strap-shaped holding apparatus for linking a multimedia device, in particular a smartphone, to a rod-shaped object, comprising a first strap section, a second strap section, and a centre section connecting the two strap sections, forming a support for the multimedia device and an opposite bottom side, wherein each strap section comprises an elastically extendable loop section and wherein both strap sections can be guided elastically to each other in a pincer-shaped manner from a relaxed starting position, hereby bending the strap-shaped holding apparatus in a first bend around a bending axis imagined transversely to a longitudinal axis of the strap-shaped holding apparatus, and the first strap section, in particular its loop section, can be guided through a through-hole arranged in the second strap section or in the centre section, wherein the strap-shaped holding apparatus encloses a space abutting the bottom side of the centre section in a form of a looping and both loop sections of the strap sections can be conveyed under pretension into a mounting position facing the support as being formed by the centre section, according to the preamble of claim 1.

BACKGROUND

A generic holding apparatus primarily serves for fastening a satellite (in particular GPS) and/or mobile radio-controlled navigation device or smartphone to a vehicle, in particular a bicycle.

However, the holding apparatus can also be used for fastening arbitrary other multimedia devices (devices for processing electronic data) such as optical or acoustic recording devices, tablet PCs, mobile radio telephones and other information or telecommunication devices to arbitrary rod-shaped objects suitable for fastening. Due to the increasing multifunctionality of various handheld devices, the intended purpose of a multimedia device applied to the bicycle or vehicle can also vary. Depending on the use as a navigation device, communication device, radio, camera or also as an illumination element, the multimedia device can be fastened temporarily to the bicycle or vehicle in an appropriate position by means of the holding apparatus.

For the predominate number of uses, a fastening of the multimedia device to a handlebar of a bicycle or a motorcycle will be possible in a position facing the user. If necessary, the holding apparatus can however also be used for extraordinary purposes, e.g. for mounting a smartphone as an illumination element or as a camera to the vertical telescopic rod of a bicycle.

The rod-shaped object, which can be enclosed by the holding apparatus according to the invention, is thus preferably a handlebar of a bicycle or a motorcycle. The invention can however basically be used with any vehicle or any other device, which has a rod-like object, in particular a transverse handlebar. In addition to the primary usage areas "bicycle/motorcycle" the present invention can thus be used with various pedal- and engine-operated vehicles with two or more wheels, such as buggies, jeeps, off-road vehicles and the like. A use for construction, transport and water vehicles can also be sensible.

Numerous holding apparatuses for multimedia devices and mobile phones are already known from the automotive area, which enable a fixation of the multimedia device in the cockpit of the vehicle by means of various clamping or engaging apparatuses. Most of these apparatuses, as for example disclosed in DE 10206310 A1 or DE 202011051891 U1, however have rigid base parts, which do not ensure a sufficient damping compensation and slip security with a use in the two-wheeled area.

A strap-shaped holding apparatus introduced onto the market by the company S-SUN Enterprise, by means of which a rod-shaped object together with the multimedia device can be enclosed elastically, represents a first approach to a bicycle-suitable holding apparatus for a smartphone, but does not ensure sufficient stability in practice by means of its simple loop geometry (the smartphone is respectively overlapped frontally at its two end faces by means of a simple loop). In particular when driving over thresholds, stones or potholes, the smartphone inevitably moves into a direction oriented transversely to the loop direction and can subsequently even fall from the holder. This slipping effect is increased if the smartphone is not mounted in an exactly horizontal position to the handlebar, but in a position inclined towards the face of the user, which is in principle desirable with regard to ergonomics. As modern smartphones or multimedia devices are often found in the high price bracket due to their functional versatility, their fall at top speed is often connected to a severe financial loss of the user. In many cases, a data loss accompanying this will be accepted even more severely.

As a further disadvantage of generic holding apparatuses it has to be cited that that their loops passing transversely over the display of the smartphone or of the multimedia device can cover important parts of the display and furthermore move more and more towards each other or into the direction of the centre of the display due to their pretension directed towards a base below the handlebar during the shocks caused by driving. This can also hinder the operation of functional buttons usually arranged laterally at the smartphone.

JP 3176972 U and JP 57134877 U further have to be cited as state of the art.

JP 3176972 U shows a holding apparatus with two holding straps proceeding in parallel that can be fastened to a back side of a multimedia device. The holding straps are provided with hinges at their ends in the manner of wristwatch straps and can be wound around a bicycle handlebar. JP 57134877 U shows a rigid holding apparatus with an approximately U-shaped reception, into which a multimedia device can be inserted. The holding apparatus is fastened to a bicycle handlebar by means of a clamp that can be fixed with screws. With both above-mentioned holding apparatuses, no active clamping down of the multimedia device takes place in the direction of the bicycle handlebar, so that, in case of shocks during driving, a slipping or a loss of the multimedia device can be anticipated.

SUMMARY

The present invention is thus based on the object to provide a holding apparatus which overcomes the above-mentioned disadvantages and to enable a reliable and position-stable linking of a multimedia device as e.g. a smartphone to a rod-shaped object of a vehicle, in particular a bicycle. The holding apparatus shall be suitable to compensate for shocks caused by driving and securely prevent the danger of slipping or falling of the multimedia device. It is also desirable to set the position of the sections of the strap-shaped holding apparatus projecting into the display and via lateral functional buttons at discretion, wherein the position set by the user is not changed even by shocks caused by driving.

These objects are solved by a strap-shaped holding apparatus with the characterising characteristics of claim 1.

A generic holding apparatus for releasably linking a multimedia device, in particular a smartphone, to a rod-shaped object comprises a first strap section, a second strap section and a centre section connecting the two strap sections, forming a support for the multimedia device and a bottom side opposite thereto. Each strap section comprises an elastically extendable loop section. Both strap sections can be guided toward each other in a pincer-shaped manner from a relaxed starting position, hereby bending the strap-shaped holding apparatus in a first bend around a bending axis imagined transversely to a longitudinal axis of the strap-shaped holding apparatus, wherein the first strap section, in particular its loop section, can be guided through a through-hole arranged in the second strap section or in the centre section. The strap-shaped holding apparatus hereby encloses a space abutting the bottom side of the centre section in the form of a looping, wherein both loop sections of the strap sections can be moved under pretension into a mounting position facing the support as being formed by the centre section.

According to the invention it is provided that at least one of the loop sections comprises at least three elastically extendable holding strands, which together laterally delimit at least two holding openings arranged adjacent to each other proceeding in a direction transversely to a longitudinal axis of the strap-shaped holding apparatus. Both loop sections are preferably provided with respectively at least three holding strands in the above-described manner, in order to enable an optimum fixation of the multimedia device, so that the multimedia device is thus clamped at its end faces in a star-shaped manner by altogether at least six holding strands.

A reliable and position-stable linking of the multimedia device to a rod-shaped object, in particular to a bicycle, is enabled due to the characteristics of the invention. As a result of the three-stranded construction of the loop sections of the holding apparatus, the position of the multimedia device can be defined exactly, a slipping or falling of the multimedia device is henceforth excluded. In particular by the force components effective from the central holding strands, the lateral holding strands can be moved into a device-specific suitable position, affecting neither the display nor the lateral functional buttons. Due to the specific tension constellation with the at least three-stranded loop sections, the lateral holding strands maintain this once-defined position even during shocks caused by driving.

As a "wandering" of the multimedia device caused by shock is excluded due to the loop geometry according to the invention, it can be fastened with confidence in an ergonomically favourable position inclined with regards to the horizontal.

In a manufacture-technical advantageous embodiment version of the invention it is provided that the loop sections are designed in one piece with the strap sections, preferably the entire holding apparatus, that is, the first strap section, the second strap section and the centre section.

In a further preferred embodiment version of the invention, the holding openings are designed as through-holes through the loop sections. Even though such an embodiment version is the most efficient with regard to material and manufacturing economy, it shall be noted that it would also be feasible in an alternative embodiment version to design the holding openings as bag- or hood-shaped enveloping elements or as tabs.

According to a particularly preferred embodiment version of the invention it is provided that a central strand of the at least three elastically extendable holding strands is arranged approximately in the region of a centre axis proceeding along a longitudinal extension of the strap sections. In this manner, an exact tension distribution and centering of the multimedia device held by the holding apparatus is enabled.

According to a further preferred embodiment version of the invention it is provided that the lateral holding strands compared to a centre axis proceeding along a longitudinal extension of the strap sections proceed in the relaxed starting position of the holding apparatus essentially parallel to the centre axis or respectively diverging by less than 40° from the centre axis, while these lateral holding strands in the mounting position of the holding apparatus under pretension are respectively elastically pivoted by more than 15° compared to their starting position into a direction facing away from a central holding strand and proceeding transversely to a enclosing direction of the holding device. Thus a spreading out of the lateral (outermost) holding strands takes place during the mounting of the holding apparatus, until these have a clear Y-form to each other, wherein the base of the Y-form points in the direction of the centre section. Such a spreading out ensures a particularly high stability of the holding apparatus.

In a further development of the invention it is provided that, in a region of a transition between the centre section and the strap sections projecting therefrom on both sides, and namely at a bottom side opposite the support, at least one, preferably at least two notches proceeding transversely to a longitudinal extension of the holding apparatus are provided, which reduce the cross-sectional thickness of the holding apparatus in this region by at least a quarter, preferably by more than half.

It is the object of the notches, during the transfer of the holding apparatus or of the strap sections into their mounting position, to enable a compression of the cross section of the holding apparatus or an approximate folding over of the strap section compared to the centre section. This ensures that the centre section does not or only slightly bulge during the enclosing of the rod-shaped object by the strap sections. The support formed by the centre section thus remains predominantly flat even in the mounting position of the holding apparatus and ensures a relatively large contact surface for the multimedia device being supported with its flat housing back side. Compared to the strap-shaped holding apparatuses according to the state of the art with knob-shaped support elements and thus a mere line contact with the multimedia device, a high security results against a slipping of the multimedia device due to vibrations and shocks caused by the vehicle and the road.

A further characteristic according to the invention, which contributes to a special slip-resistance of the holding apparatus on the rod-shaped, is given by a special profiling of a bottom side of the centre section. It is hereby provided that a bottom side of the centre part, when viewing the holding apparatus in a cutting plane proceeding through its longitudinal axis and orthogonally to a width extension of the holding apparatus, is provided with a concave holding profile, which preferably proceeds centrally through the centre section. The holding profile open toward the bottom, preferably manufactured in one piece with the centre section, enables a form-fit contacting of the rod-shaped object and also prevents a bulging of the support in the course of the mounting of the holding apparatus.

According to a further special further development of the invention it is provided that one or more holding grooves or holding knobs are arranged in a region of a transition between the centre section on a support side and the strap sections, to which grooves the first and/or the second loop section can be hooked after the enclosing of a space or the rod-shaped object has taken place in an intermediate position prior to a completed mounting position. A particular ease of operation of the holding apparatus results in this manner. At least one of the loop sections can, after the rod-shaped has been enclosed in a cycloid-shaped manner, be provisionally linked to the holding grooves, so that subsequently the entire attention of the user can be used for the tensioning and placing of the still free loop section which is not linked to the holding grooves to an end face region of the multimedia device and to the setting of the multimedia device onto the support. A comfortable one-handed mounting of the holding apparatus is possible.

In order to be able to fasten the holding apparatus according to the invention to the rod-shaped object of the vehicle in a stationary manner, at least one channel for receiving a string- or strap-shaped securing element is provided according to a preferred embodiment version, in the region of the centre section, extending in a direction of a longitudinal extension of the holding apparatus. This channel can be arranged in a region of the support and be open toward the top. The channel can hereby still extend into the strap sections. It is also possible that the channel passes through a cross section of the centre section at least in sections in a form of a passage, preferably in the region of a holding profile formed at the bottom side of the centre section. A cable tie, a wire, plastic or textile strap, a string or the like can be used as securing element. A loss of the holding apparatus is thereby prevented in particular with bicycles, which are in the pool of a bicycle rental outlet. A through-hole or recess forming the channel permits a lowering of the securing element cross section into a plane below the support, so that a large-area contact between the support and the housing back of the multimedia device is furthermore ensured.

In a particularly preferred alternative design, the holding apparatus according to the invention is manufactured of a silicon- or rubber-based material at least in the area of its strap sections, preferably completely. Silicon and rubber ensure a reliable fixing of the multimedia device due to their high elasticity and durability.

BRIEF DESCRIPTION OF THE DRAWINGS

The invention is now explained by means of an exemplary embodiment. It shows thereby:

FIG. 3 the holding apparatus according to the invention of FIG. 1 in a plan view FIG. 4 the holding apparatus according to the invention of FIG. 3 in a side view FIG. 5 the holding apparatus according to the invention of FIG. 3 in a front view according to the viewing direction A in FIG. 3

DETAILED DESCRIPTION

Figure 1:
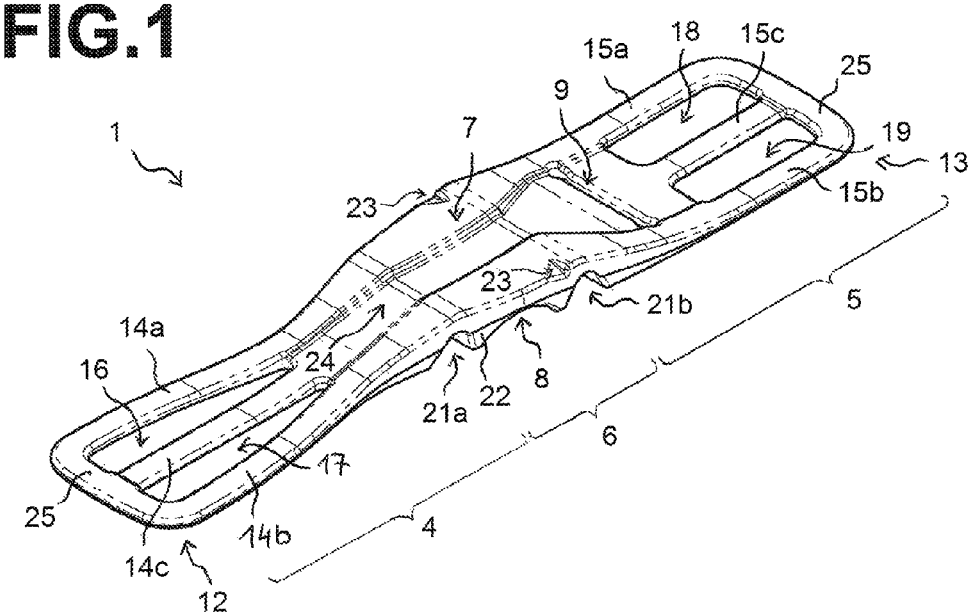
FIG. 1 a holding apparatus according to the invention in an isometric view (starting position)

FIG. 1 shows a holding apparatus 1 according to the invention, which is still in a relaxed starting position.

Figure 2:
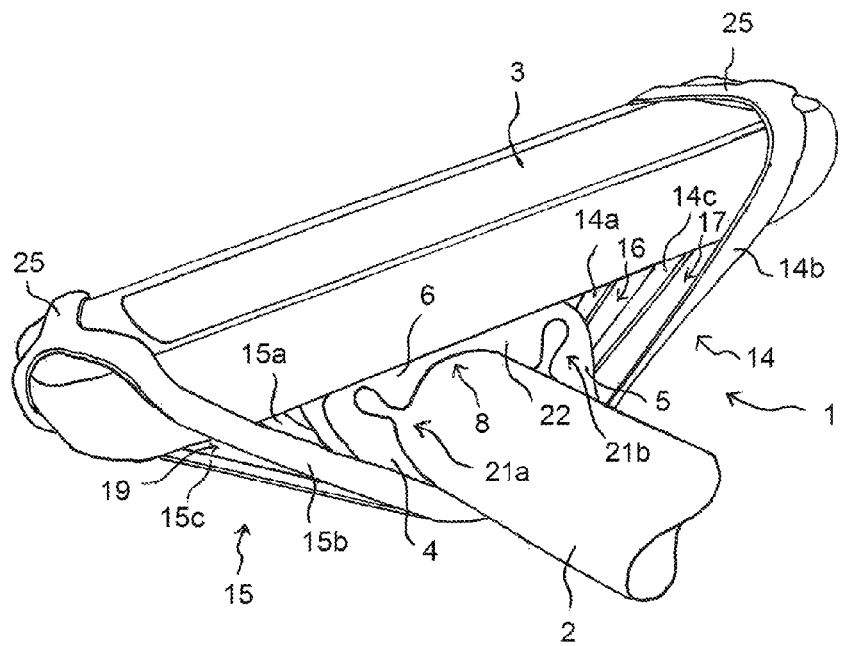
FIG. 2 a holding apparatus according to the invention in an isometric view (mounting position)

It comprises a first strap section 4, a second strap section 5 and a centre section 6 connecting the two strap sections 4, 5. The centre section 6 forms a support 7 for a multimedia device 3 at its upper side, its opposite bottom side 8 is provided for a form-fit contacting of a rod-shaped object 2 of a bicycle or a motorcycle, in particular a handlebar provided with handles on both sides, indicated schematically in FIG. 2. As has already been mentioned initially, the holding apparatus 1 according to the invention can however also be mounted to suitable components of arbitrary other vehicles or other mobile or stationary devices in order to connect a multimedia device 3.

The respective rod-shaped object 2, to which the holding apparatus is to be mounted can have an arbitrary geometry. It can be designed in a straight, curved or angled manner, wherein the cross-sectional profile can also have an arbitrary, e.g. circular, oval, rectangular or polygonal form.

The linked multimedia device is a navigable smartphone in the present application, which is readily used by cyclists in order to reach the destination also in towns with which they are still unfamiliar with quickly and without detours.

As can be seen in FIG. 3, the strap-shaped holding apparatus 1 is designed essentially symmetrical with regards to a centre axis 10 proceeding in a longitudinal direction.

Each strap section 4, 5 has an elastically extendable loop section 14, 15 at its free end area 12, 13 facing away from the centre section 6, which loop section is preferably manufactured in one piece with the respective strap section 4, 5.

According to the invention, at least one of the loop sections 14, 15 respectively has at least three elastically extendable holding strands 14*a*, 14*b*, 14*c*; 15*a*, 15*b*, 15*c*, which laterally delimit at least two holding openings 16, 17; 18, 19 arranged adjacent to each other proceeding in a direction transversely to a longitudinal extension of the strap-shaped holding apparatus or to the centre axis. In the present exemplary embodiment (FIG. 1, FIG. 3), both loop sections 14, 15 are provided in such a manner with respectively at least three holding strands: the first strap section 4 or its loop section 14 facing away from the centre section 6 comprises the three holding strands 14*a*, 14*b* and 14*c*, the second strap section 5 or its loop section 15 also facing away from the centre section comprises the three holding strands 15*a*, 15*b* and 15*c*. The holding openings 16, 17; 18, 19 are designed as through-holes through the loop sections.

The loop section 14, 15 constituted by the holding strands 14a, 14b, 14c; 15a, 15b, 15c lies in the relaxed starting position of the holding apparatus 1 according to the invention essentially in a plane with the strap sections 4, 4 and with the centre section or projects in extension from these component sections (FIG. 4).

The holding strands 14a, 14b, 14c; 15a, 15b, 15c are connected to each other in the region of their end regions facing away from the centre section 6 by front lugs 25, which essentially have the same constitution as the holding strands 14a, 14b, 14c; 15a, 15b, 15c themselves. Due to the one-piece design of the holding apparatus 1 it could also be stated that the holding strands 14a, 14b, 14c; 15a, 15b, 15c flow into each other (FIG. 3) via the front lugs 25. The front lugs 25 are hereby in free end regions 12, 13 of the strap sections 4, 5 or of the loop sections 14, 15 facing away from the centre section.

As can also be seen in FIG. 3, a through-hole 9 extending transversely to the centre axis 10 is provided in the second strap section 5 in a region localised between the centre section 6 and the loop section 15. The manner in which the holding apparatus 1 according to FIG. 1 is conveyed to a mounting position under a pretension, fixing the multimedia device 3 to the rod-shaped object 2, is shown schematically in FIGS. 6-8.

Figure 6:
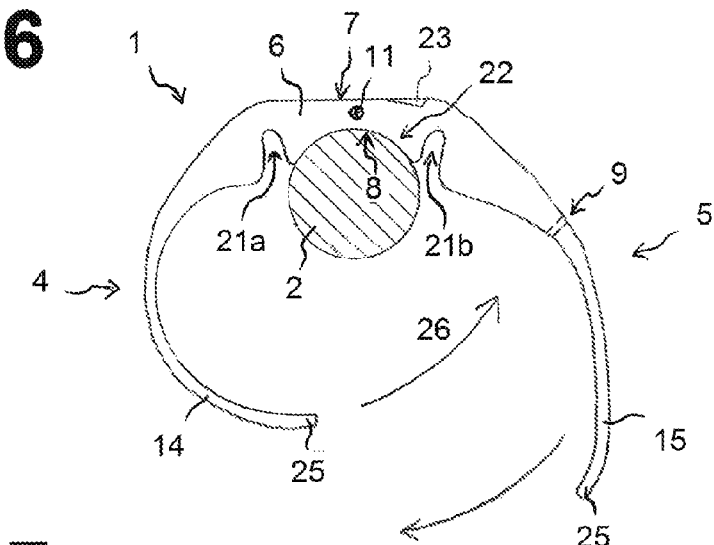
FIG. 6 a schematic representation of the functionality of the holding apparatus according to the invention (first mounting phase)

Starting from a relaxed starting position shown in FIG. 4, the first strap section 4 projecting from the centre section 6 or passing into this and the second strap section 5 projecting from the centre section 6 or passing into this can be guided towards each other in a pincer-shaped manner (FIG. 6). The strap-shaped holding apparatus 1 hereby experiences a first bend around a bending axis 11 imagined transversely to a longitudinal axis 10 and essentially parallel to a surface formed by the support 7.

Subsequently the first strap section 4, more precisely its loop section 14, is guided through the through-hole 9 already mentioned arranged in the second strap section 5 in the direction of the arrow 16.

Figure 7:
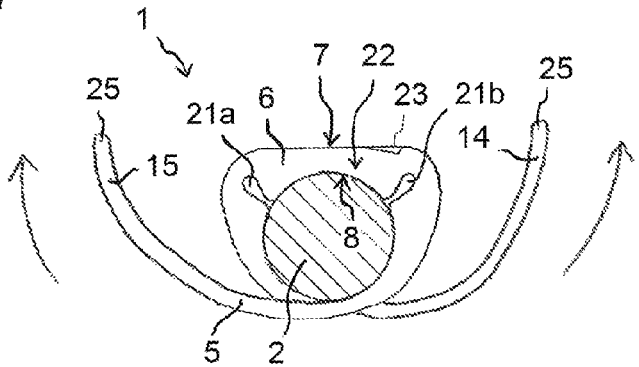
FIG. 7 a schematic representation of the functionality of the holding apparatus according to the invention (second mounting phase)

The strap-shaped holding apparatus 1 hereby encloses a space or the hatched cross section of the rod-shaped object 2 abutting the bottom side 8 of the centre section 6 essentially in the form of a looping or a twisted cycloid (see FIG. 7).

The through-hole 9 is designed as a slot proceeding transversely to a longitudinal extension of the holding apparatus 1 in the present exemplary embodiment. The presence of the through-hole 9 also simultaneously signalises the user the functionality of the holding apparatus 1 according to the invention or the direction into which he shall thread the free end section of the holding apparatus 1 into the first loop section 14. A concave holding profile 22 explained in more detail later arranged at the bottom side 8 of the centre section 6 and provided for receiving the rod-shaped object 2 also contributes to an intuitive usability of the holding apparatus 1.

After the holding apparatus 1 has been conveyed into the one in FIG. 7, a further characteristic of the invention is employed: in the region of the transition between the centre section 6 on the support side and the strap sections 4, 5 are arranged one or several (in the present example: 2) holding grooves 23, to which the first and/or the second loop section 14, 15 can be hooked after the enclosure of the space or of the rod-shaped object in an intermediate position preceding the completed mounting position (also see FIG. 1). The first loop section 14 guided through the second strap section 5 can thus, after the rod-shaped object 2 was enclosed in the form of a cycloid, be linked provisionally to the holding grooves 23. The user can subsequently concentrate completely on the tensioning and positioning of the second strap section 5 or of the second loop section 15 to an end face region of the multimedia device 3. It shall be noted that the holding grooves 23 can also be designed as holding knobs.

As can be seen in FIG. 4 and FIG. 7, the holding grooves are arranged essentially opposite to the notches 21a, 21b of the bottom side 8 still to be explained. In a manufacture- and rigidity-technical advantageous embodiment version, the holding grooves 23 do not proceed like the notches 21a, 21b of the bottom side 8 provided as compression zones over the entire width of the holding apparatus 1, but respectively only the edge regions of the holding apparatus 1 peripheral to the centre axis 10, more precisely of the centre section 6, are notched (see FIG. 1 and FIG. 3).

It is also possible to provide the holding groove(s)/holding knobs 23 on both sides of the support 7 or on both sides of a bending axis 11 proceeding transversely to the centre axis 10, drawn in FIG. 3, at the centre section 6 (preferably symmetrical to the bending axis 10). In this manner, the strap sections 4, 5 of the holding apparatus 1 according to the invention can be fastened in a compact position at the rod-shaped object, also without the multimedia device 3.

Figure 8:
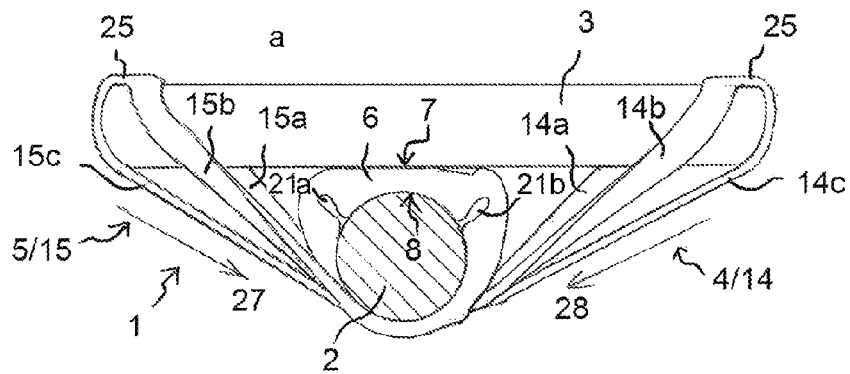
FIG. 8 a schematic representation of the functionality of the holding apparatus according to the invention (third mounting phase)

FIG. 8 finally shows the completed mounting position of the holding apparatus 1 according to the invention, in which both loop sections 14, 15 were conveyed or pulled under pretension into a mounting position facing the support 7, where they clamp the multimedia device 3 in an approximately star-shaped manner at its opposite end faces with respectively three, thus altogether six holding strands 14a, 14b, 14c; 15a, 15b, 15c. The force vectors underlying the pretension hereby essentially proceed in the direction of the intersection point of the cycloid loop carried out by the strap-shaped holding apparatus 1 (see arrows 27, 28).

Figure 9:
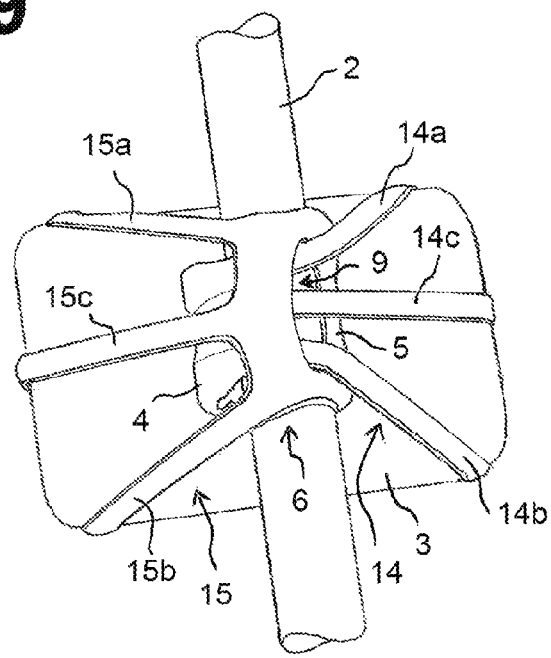
FIG. 9 the holding apparatus according to the invention of FIG. 2, seen from below FIG. 10 a holding apparatus according to the state of the art (in an advanced starting position)

A detailed presentation of the penetration of the strap sections 4 and 5 or of the symmetrical clamping of the multimedia device 3 through the holding strands 14a, 14b, 14c; 15a, 15b, 15c according to the invention is given in a perspective bottom view of the holding apparatus 1 according to FIG. 9.

As has already been mentioned, a first notch 21a is arranged in the transition region between the centre section 6 and the first strap section 4 and a second notch 21b is arranged in the transition region between the centre section 6 and the second strap section 4. The notches 21a, 21b open toward the bottom reduce the cross-sectional thickness of the holding apparatus 1 in this region by at least a quarter, preferably by more than the half. The clear cross-sectional geometry of the notch 21a, 21b has a parabola-shaped form in the relaxed staring position of the holding apparatus 1, it could however also have an alternative form, e.g. triangular, semi-circular or oval form. As can be seen in FIG. 4, the notch 21a, 21b has a clear cross-sectional width which tapers in the direction of the support 7 and widens in the direction of the bottom side 8.

Figure 10:
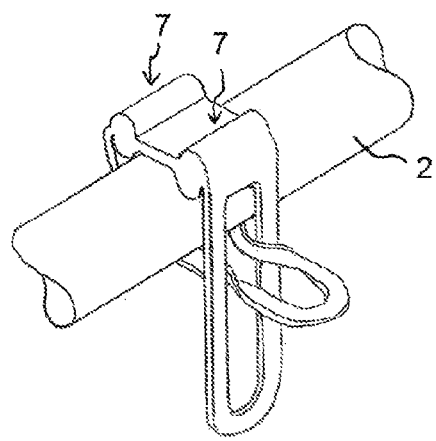
Figure 11:
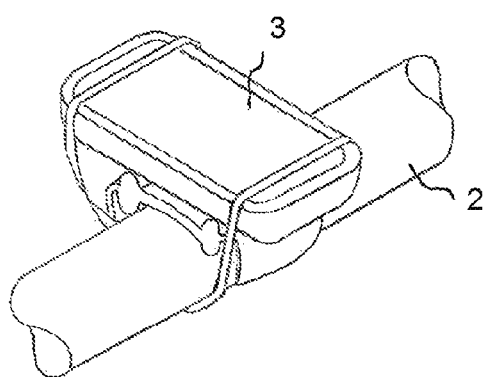
FIG. 11 a holding apparatus according to the state of the art (in a completed mounting position)

It is essential that the notches 21a, 21b enable a compression of the cross section of the holding apparatus 1 or an approximate folding over of the strap sections 4, 5 with regard to the centre section 6 during the transition of the holding apparatus 1 or of the strap sections 4, 5 into their mounting position (see FIG. 6 and FIG. 8). This ensures that the centre section 6 does not or only slightly bulges during the enclosure of the rod-shaped object 2 by the strap sections 4, 5. The support 7 formed by the centre section 6 therefore remains largely flat also in the mounting position of the holding apparatus 1 under tension and ensures a relatively large contact surface for the multimedia device 3 being supported with its flat housing back side (see FIGS. 7 and 8). Compared to strap-shaped holding apparatuses according to the state of the art with knob-shaped support elements and thus mere line contact with the multimedia device (see FIGS. 10 and 11), a high security against slipping of the multimedia device results thus as a result of vibrations and shocks caused by the vehicle and the road.

In the shown embodiment version, the entire holding apparatus 1, that is, the first strap section 4, the second strap section 5 and the centre section 6, is designed in one piece.

According to FIG. 3, the central of the three elastically extendable holding strands 14*a*, 14*b*, 14*c*; 15*a*, 15*b*, 15*c* is arranged approximately in a region of a centre axis 10 proceeding along a longitudinal extension of the strap sections 4, 5. In this manner, an exact tension distribution and centering of the multimedia device held by the holding apparatus is enabled. It shall be noted that respectively more than a central holding strand 14*c*, 15*c* can be provided between the two lateral holding strands 14*a* and 14*b* or 15*a* and 15*b*. The geometry of the holding openings (16, 17, 18, 19) and of the through-hole 9 can also vary from the form suggested in the exemplary embodiment without deviating from the basic idea of the present invention.

While the central holding strands 14*c*, 15*c* preferably proceed in a congruent manner with the centre axis 10 in the relaxed starting position and in the mounting position under pretension fixing the multimedia device 3 essentially in the region of the centre axis 10, the orientation of the lateral holding strands 14*a*, 14*b*; 15*a*, 15*b* changes substantially during the conveyance into the mounting position: the holding strands 14*a*, 14*b*; 15*a*, 15*b* lateral with regard to the centre axis 10 proceed in the relaxed starting position of the holding apparatus 1 (see FIG. 3) essentially parallel to the centre axis 10 or respectively diverging from the centre axis 10 by less than 40°, while these lateral holding strands 14*a*, 14*b*; 15*a*, 15*b* in the mounting position of the holding apparatus 1 under pretension (see in particular FIG. 9) are elastically pivoted respectively by more than 15° compared to their starting position into a direction facing away from the centre holding strand 14*c*, 15*c* proceeding transversely to the centre axis 10 and transversely to the enclosing direction of the holding apparatus 1, that is, when viewing the broad side of the holding apparatus 1 in a viewing direction according to FIG. 3. Thus, a spreading out of the lateral (outermost) holding strands 14*a*, 14*b*; 15*a*, 15*b* takes place during the mounting of the holding apparatus 1, until this have a clear Y-form with regard to each other, wherein the base of the Y-form points in the direction of the centre section 6. Such a spreading out ensures a high stability of the holding apparatus. The opening angle of the Y-form is hereby more than 30°, preferably more than 40°.

The holding openings 16, 17; 18, 19 arranged at the loops are essentially arranged symmetrically to the centre axis 10 proceeding along the longitudinal extension of the strap sections 4, 5, in order to ensure an even tension distribution in the mounting stage of the holding apparatus. The holding strands 14*a*, 14*b*, 14*c*; 15*a*, 15*b*, 15*c* of a loop section 14, 15 also have an approximately same length, width and thickness. In a preferred design version, the holding openings 16, 17; 18, 19 have an elongated form, that is, their longitudinal extension measured in the longitudinal direction of the holding apparatus 1 is at least three times larger than their average width measured transversely to the longitudinal direction of the holding apparatus 1. Due to manufacture-technical reasons, the holding openings 16, 17; 18, 19 are designed not as angular, but as rounded or oval.

A holding apparatus 1 suitable in a special manner for an adaptation to a bicycle is altogether between 15 and 20 cm long in the relaxed starting position. The width can conveniently vary between two and five centimeters. In order to ensure a solid clamping of the multimedia device, the length of the loop sections 14, 15 is more than a third, preferably more than half of the entire length of the respective strap sections 4, 5. With a strap section length of about seven centimeters, the length of the loop sections 14, 15 or of the holding strands 14*a*, 14*b*, 14*c*; 15*a*, 15*b*, 15*c* constituting these about four to five centimeters, measured in a relaxed starting position of the holding apparatus 1.

The thickness of the holding apparatus 1 or of the centre section 6, of the strap sections 4, 5 and of the loop sections 14, 15 can be chosen freely as can their length and width depending on the desired usage requirements. In the present exemplary embodiment, the thickness of the holding apparatus 1 varies from about two to ten millimeters. As can be seen in FIG. 4, the centre part 6 and the transition regions to the strap sections 4, 5 are formed the thickest here, while the free end regions of the strap sections 4, 5 or of the loop sections 14, 15 decrease increasingly in their cross-sectional thickness.

As has already been mentioned in the course of the mounting description, the bottom side 8 of the centre part 6, when viewing the holding apparatus 1 in a sectional plane proceeding through its longitudinal axis 10 and orthogonally to the width extension of the holding apparatus 1 (see FIG. 4 and FIG. 6), is provided with a concave holding profile 22, which preferably proceeds centrally through the centre section 6. The holding profile 22 open toward the bottom, preferably manufactured in one piece with the centre section 6, enables a form-fit contacting of the rod-shaped object 2 and also prevents an upward bulging of the support in the course of the mounting of the holding apparatus 1.

Alternatively or additionally, the bottom side 8 of the centre part 6 and/or the strap sections 4, 5 can be provided with an anti-slip profile, e.g. a beaded surface.

In the region of the support 7 of the centre section 6 is provided at least one channel 24 open toward the top, extending in the direction of the longitudinal extension of the holding apparatus 1. This channel 24, which also extends into the strap sections 4, 5 in a preferred embodiment version, is suitable for receiving a securing element, by means of which the holding apparatus 1 according to the invention can be fastened to the rod-shaped object 2 in a stationary manner. Possible securing elements are for example cable ties, wire, plastic or textile straps, string. The channel 24 can e.g. have a depth of 1-3 mm.

In an embodiment version not shown, the channel 24 (or one or more additional channels) can also be designed as a tunnel-shaped passage in the centre section 6 extending in the direction of the longitudinal extension of the holding apparatus 1. The centre section 6 or also parts of the strap sections 4, 5 can hereby be passed through by corresponding tunnel-shaped passages, that is, surrounded on all sides by the component cross section. In a particularly practical embodiment, the at least one tunnel-shaped passage is arranged in the region of web sections 22*a*, 22*b* of the holding profile 22 indicated in FIG. 4, which delimit their concave bulging. The channel 24 or the tunnel-shaped passage is hereby arranged essentially centrally with regard to the width extension of the centre section 6, so that the holding apparatus 1 can be fixed to the rod-shaped object in a centered manner.

The holding apparatus 1 according to the invention is, at least in the region of its strap sections 4, 5, preferably entirely, manufactured of a silicon- or rubber-based material. Any natural, synthetic or semi-synthetic material having corresponding elastic properties known in industrial manufacture is basically suitable as a material for the manufacture of the holding apparatus 1 according to the invention. In particular polymer materials and rubber products or equivalent substitutes can be used. The use of composite materials and textile materials, e.g. textiles provided elastane is also feasible. The mixing ratios of the silicon- or rubber-based material and possible additives can be selected in dependence on desired specific properties. A particular ecological and recyclable embodiment version of the invention results with the design of the holding apparatus 1 of natural rubber. In the case of a multi-part design of the holding apparatus 1 it can also be sufficient to manufacture only individual components, in particular the loop sections 14, 15 or the entire strap sections 4, 5 from one of the above-mentioned elastic materials.

The strap sections 4, 5 projecting left and right from the centre section 6 have essentially the same length. In a preferred embodiment, the strap section 5 having the through-hole 9 is slightly shorter than the other strap section 4. The through-hole 9 provided for guiding the first strap section 4 through is arranged in a half of the second strap section 5 facing the centre section 6, preferably in a third of the second strap section 5 facing the centre section 6.

The invention claimed is:

1. A strap-shaped holding apparatus for releasably linking a multimedia device, in particular a smartphone to a rod-shaped object, comprising a first strap section, a second strap section and a center section connecting the two strap sections, forming a support for the multimedia device and an opposite bottom side, wherein each strap section comprises an elastically extendable loop section and wherein both strap sections can be guided elastically to each other in a pincer-shaped manner from a relaxed starting position, hereby bending the strap-shaped holding apparatus in a first bend around a bending axis imagined transversely to a longitudinal axis of the strap-shaped holding apparatus, and the first strap section, in particular its loop section can be guided through a through-hole arranged in the second strap section or in the center section, wherein the strap-shaped holding apparatus encloses a space abutting a bottom side of the center section in a form of a looping and both loop sections of the strap sections can be conveyed under pretension into a mounting position facing the support as being formed by the center section, wherein at least one of the loop sections, has at least three elastically extendable holding strands, which laterally delimit at least two holding openings arranged adjacent to each other proceeding in a direction transversely to a longitudinal extension of the strap-shaped holding apparatus.

2. The strap-shaped holding apparatus according to claim 1, wherein the loop sections are designed in one piece with the strap sections.

3. The strap-shaped holding apparatus according to claim 1, wherein the holding openings are implemented as breakthroughs through a loop section.

4. The strap-shaped holding apparatus according to claim 1, wherein a central of the at least three elastically extendable holding strands is arranged approximately in a region of a center axis proceeding along a longitudinal extension of the strap sections.

5. The strap-shaped holding apparatus according to claim 1, wherein the holding strands compared to a center axis proceeding along a longitudinal extension of the strap sections proceed in the relaxed starting position of the holding apparatus in parallel to the center axis or respectively diverging by less than 40° from the center axis, while these lateral holding strands in the mounting position are elastically pivoted respectively by more than 15° compared to their starting position into a direction facing away from a central holding strand transversely to the center axis and transversely to a enclosing direction of the holding apparatus.

6. The strap-shaped holding apparatus according to claim 1, wherein at least two notches proceeding transversely to the longitudinal extension of the holding apparatus are provided in a region of a transition between the center section and the strap sections projecting therefrom on both sides, and namely at a bottom side opposite the support, which notches reduce a cross-sectional thickness of the holding apparatus in this region by at least a quarter.

7. The strap-shaped holding apparatus according to claim 1, wherein the bottom side of the center section when viewing the holding apparatus in a sectional plane proceeding through its longitudinal axis and orthogonally to a width extension of the holding apparatus, is provided with a concave holding profile.

8. The strap-shaped holding apparatus according to claim 1, wherein one or several holding grooves or holding knobs are arranged in a region of a transition between the center section on a support side and the strap sections, in which grooves the first and/or the second loop section can be hooked in an intermediate position preceding a completed mounting position after an enclosure of a space abutting the bottom side of the center section has taken place.

9. The strap-shaped holding apparatus according to claim 1, wherein at least one channel extending into a direction of the longitudinal extension of the holding apparatus for receiving a strap-shaped securing element is provided, wherein the channel is either arranged in a region of the support and is open toward a top or the channel passes through a cross section of the center section at least in sections in a form of a tunnel-shaped passage.

10. The strap-shaped holding apparatus according to claim 1, wherein the holding apparatus is manufactured of a silicon- or rubber-based material at least in an area of its strap sections.

11. The strap-shaped holding apparatus according to claim 1, wherein the holding apparatus is entirely manufactured of a silicon- or rubber-based material.

12. The strap-shaped holding apparatus according to claim 1, wherein both loop sections have at least three elastically extendable holding strands, which laterally delimit at least two holding openings arranged adjacent to each other proceeding in a direction transversely to the longitudinal extension of the strap-shaped holding apparatus.

13. The strap-shaped holding apparatus according to claim 1, wherein the holding apparatus, that is, the first strap section, the second strap section and the center section is designed in one piece.

* * * * *